(12) United States Patent
Doshi et al.

(10) Patent No.: US 7,633,896 B2
(45) Date of Patent: Dec. 15, 2009

(54) APPARATUS AND METHOD FOR ENABLING OPTIMIZED GATEWAY SELECTION FOR INTER-WORKING BETWEEN CIRCUIT-SWITCHED AND INTERNET TELEPHONY

(75) Inventors: Parag M. Doshi, Hazlet, NJ (US); Oliver Haase, Fair Haven, NJ (US); Jonathan Michael Lennox, New York, NY (US); Kazutaka Murakami, Freehold, NJ (US); Ming Xiong, Somerville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 632 days.

(21) Appl. No.: 10/055,333

(22) Filed: Jan. 23, 2002

(65) Prior Publication Data

US 2003/0137991 A1 Jul. 24, 2003

(51) Int. Cl.
*H04W 4/00* (2009.01)
(52) U.S. Cl. .................. 370/328; 370/338; 370/357; 370/352; 370/355; 455/456.1
(58) Field of Classification Search .......... 370/464–467, 370/328, 401, 351–357, 338, 400; 455/456.1
See application file for complete search history.

(56) References Cited

U.S. PATENT DOCUMENTS

| | | | |
|---|---|---|---|
| 6,504,839 B2 * | 1/2003 | Valentine et al. ............ 370/354 |
| 6,594,253 B1 * | 7/2003 | Sallberg et al. ............. 370/349 |
| 6,711,146 B2 * | 3/2004 | Yegoshin ..................... 370/338 |
| 6,885,658 B1 * | 4/2005 | Ress et al. ................... 370/352 |
| 6,961,563 B2 * | 11/2005 | Holler et al. ............. 455/432.1 |
| 2001/0055285 A1 * | 12/2001 | Tomoike ..................... 370/328 |
| 2003/0202521 A1 * | 10/2003 | Havinis et al. .............. 370/401 |
| 2004/0258239 A1 * | 12/2004 | Gallant et al. ............... 379/900 |
| 2005/0286501 A1 * | 12/2005 | Higuchi ....................... 370/352 |

\* cited by examiner

*Primary Examiner*—Aung S Moe
*Assistant Examiner*—Christopher P Grey
(74) *Attorney, Agent, or Firm*—Wall & Tong, LLP; Matthew J. Hodulik

(57) ABSTRACT

An optimized gateway selection process of the present invention is based on a universal mobility manager (UMM), a component for inter-technology location management. The UMM is capable of holding location information for diverse cellular networks, as well as for Internet telephony systems. For cellular networks, UMM acts as a traditional HLR; for an Internet telephony network, it acts as the entities that are responsible for user/terminal registration (registrar in SIP, gatekeeper in H.323) and address resolution (proxy server in SIP, gatekeeper in H.323). An optimal gateway selection is possible based on location related information provided by the UMM which had not previously been available. Utilizing the newly available information enables a gateway to be selected which may, for example, enable the circuit switched portion of a call to now be minimized.

30 Claims, 4 Drawing Sheets

CALL SETUP FOR 'SIP TO MOBILE' INTERWORKING WITH UMM

CALL SETUP FOR 'SIP TO FIXED-WIRE PSTN' INTERWORKING

CALL SETUP FOR 'SIP TO MOBILE' INTERWORKING

CALL SETUP FOR 'PSTN TO SIP' INTERWORKING

CALL SETUP FOR 'SIP TO MOBILE' INTERWORKING WITH UMM

CALL SETUP FOR 'PSTN TO SIP' INTERWORKING WITH UMM

APPARATUS AND METHOD FOR ENABLING OPTIMIZED GATEWAY SELECTION FOR INTER-WORKING BETWEEN CIRCUIT-SWITCHED AND INTERNET TELEPHONY

RELATED APPLICATION

This application is related to commonly assigned U.S. patent application Ser. No. 09/813,016 entitled Multiple-Protocol Home Location Register and Method of Use by LaPorta et al., filed Mar. 19, 2001, the content of that application being incorporated herein by reference.

FIELD OF THE INVENTION

The present invention relates generally to the field of communications networks and more particularly to methodologies for Inter-working between a circuit-switched network and Internet telephony applications.

BACKGROUND OF THE INVENTION

Inter-working between a circuit-switched network and Internet telephony requires that the call be routed via an appropriate signaling and media gateway. This gateway, which appears as an end device to both involved technologies, translates the signaling messages and the media streams between the two involved signaling protocols and media formats. Optimization of the selection of one particular gateway for a call essentially means to best meet the selection policies of the involved parties, i.e., caller, callee, network and gateway providers. These policies are typically based on criteria such as: minimizing triangle routing; minimizing the circuit-switched call leg (e.g. to minimize cost); and maximizing the provisioned Quality of Service (which can be viewed to mean to minimize the Internet call leg); and gateway capacity and load balancing.

For inter-working calls from an Internet telephony user agent to a fixed-wire PSTN network the originating technology, i.e. the originating Internet telephony network, knows the location of the party to be called by the structure of its E.164 phone number. Consequently, the gateway selection process can be based on knowledge about the entire resulting call path, and can thus be optimized towards the selection criteria mentioned above.

When the location of the called party is not reflected by its address—because the terminating technology supports device mobility (cellular phone networks) or user mobility (e.g., SIP—Session Initiation Protocol)—the originating technology must perform the gateway selection without knowledge of the called party's location, and thus without knowledge of the resulting call path. This is sub-optimal as many of the above mentioned selection criteria require prior knowledge of the resulting call path. As an example, assume a SIP user calls a GSM phone and the gateway selection criterion is 'minimize the PSTN call leg'. This criterion is best met by selecting a gateway that is close to the GSM callee; but as the actual location of the callee is not known to the originating SIP network, this selection cannot be made.

The above scenarios cannot be dealt with by means of existing gateway selection techniques. Instead, there is a need for a more comprehensive concept of mobility management.

SUMMARY OF THE INVENTION

An optimized gateway selection process of the present invention is based on a universal mobility manager (UMM), a component for inter-technology location management. The UMM is capable of holding location information for diverse cellular networks, as well as for Internet telephony systems. For cellular networks, UMM acts as a traditional HLR; for an Internet telephony network, it acts as the entities that are responsible for user/terminal registration (registrar in SIP, gatekeeper in H.323) and address resolution (proxy server in SIP, gatekeeper in H.323). An optimal gateway selection is possible based on location related information provided by the UMM which had not previously been available. Utilizing the newly available information enables a gateway to be selected which may, for example, enable the circuit switched portion of a call to now be minimized.

An exemplary method of selecting a gateway for inter-working between a first and second network supporting different network protocols in accordance with the invention is described. The method includes the steps of querying a unified location management device having location information stored therein for users of the different network protocols and relaying mobile user location related information from the unified location manager regarding a user of one of the first and second network. A gateway is selected based on the location information provided.

An apparatus for enabling optimized gateway selection for interworking between a first and second network is also described. The apparatus includes a data server for storing location and service profile data for multiple differing network technologies and at least two network protocol gateways for translating incoming location information requests into a protocol independent format. A processor is also included for interfacing between the data server and the protocol gateways, wherein mobile user location related information is able to be provided by said apparatus for use in selection of said gateway.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Although the present invention is described in connection with SIP (Session Initiation Protocol) as one example of Internet telephony, it would be understood that the invention may also be used with other Internet telephony technologies, such as H.323 and other network protocol that would be understood to be applicable by those persons skilled in the art.

In connection with the present invention, a review of existing gateway selection technology is useful since it shows what techniques for gateway selection are already available and can be re-used for a more comprehensive approach. Such a review also indicates what kinds of call set-up scenarios are not adequately dealt with in terms of optimized gateway selection. As for the gateway selection process, three different call set-up scenarios need to be distinguished: SIP to fixed-wire PSTN; SIP to mobile PSTN; and PSTN (fixed-wire or mobile) to SIP.

Only the first scenario can be dealt with appropriately by today's gateway selection techniques, while the other two scenarios have not yet been addressed in the to-date literature.

Calls from SIP to Fixed-Wire PSTN

Considerable effort has been spent to solve the gateway selection problem for the inter-working scenario that addresses calls from SIP to fixed-wire PSTN. A significant part of the solution to this problem is the introduction of a new SIP entity, termed a location server. Whenever a PSTN user is to be called, a location request is issued to the location server which is responsible for the actual gateway selection.

Figure 1:
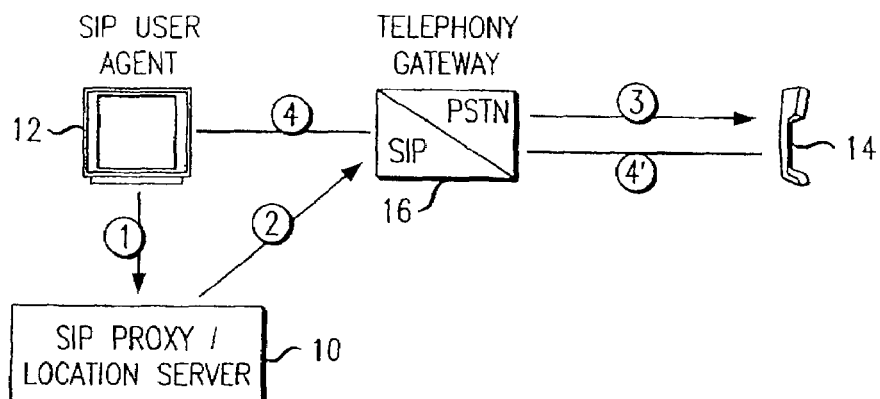
FIG. 1 is an illustration of a prior art call setup for SIP to fixed-wire PSTN interworking.

FIG. 1 illustrates a typical case where a location server is co-located with a SIP outbound proxy responsible for a given domain, e.g., domain.com shown as SIP Proxy/Location Server 10. In this case, the SIP caller/user agent 12 sends a SIP INVITE request INVITE SIP:pn@domain.com to the outbound proxy 10 in order to set up a call with phone pn 14 which is illustrated by path 1, and the SIP proxy internally asks the location server for the gateway selection.

What is important in this context is not exactly how the gateway selection process is performed but the fact that: 1) techniques for optimized gateway selection for this type of call set-up scenarios are existent and already being standardized; and 2) these techniques depend on the location information that is contained in the standard (E.164) telephone numbering scheme. Due to this implicit location information, the location server can base the gateway selection process on knowledge of the complete call path.

Referring again to FIG. 1, it can be seen that once the location server has selected a particular gateway gw 16, it sends a SIP INVITE request INVITE SIP:pn@gw to the gateway 16 as shown by path 2. Path 3 illustrates that the gateway 16 initiates the establishment of the circuit-switched call leg towards phone pn 14. Eventually, RTP data is flowing over the Internet call leg shown by path 4, and circuit-switched data is flowing over the PSTN call leg shown by path 4'.

Calls from SIP to a Mobile Phone

The situation is different than the previous scenario for a call from SIP to a mobile phone because, for the mobile phone scenario, the phone number does not contain any location information. Hence, the location server cannot base its gateway selection decision on complete information about the resulting call path. This drawback is illustrated by examining a sample scenario shown in FIG. 2.

As in the previous case discussed with regard to FIG. 1, the call set-up starts with a SIP caller/user agent 12 sending an INVITE request INVITE IP:pn@domain.com to the outbound proxy 10 that also implements a location server. This communication is shown by path 1. Unlike before, however, the location server 10 cannot know the current location of phone pn 14, since in this case it is a mobile phone. In this regard, two cases need to be distinguished. In a first case, a call to an ANSI41 cellular phone needs to be routed via the phone's Home MSC. In a second case, a call to a GSM/UMTS phone can be routed via any arbitrary Gateway MSC. In the first case, the SIP location server will select a telephony gateway on the path between originating SIP user agent and Home MSC. In the second case, the location server can select any telephony gateway and the GSM/UMTS network will automatically route the PSTN call leg to the nearest Gateway MSC.

Figure 2:
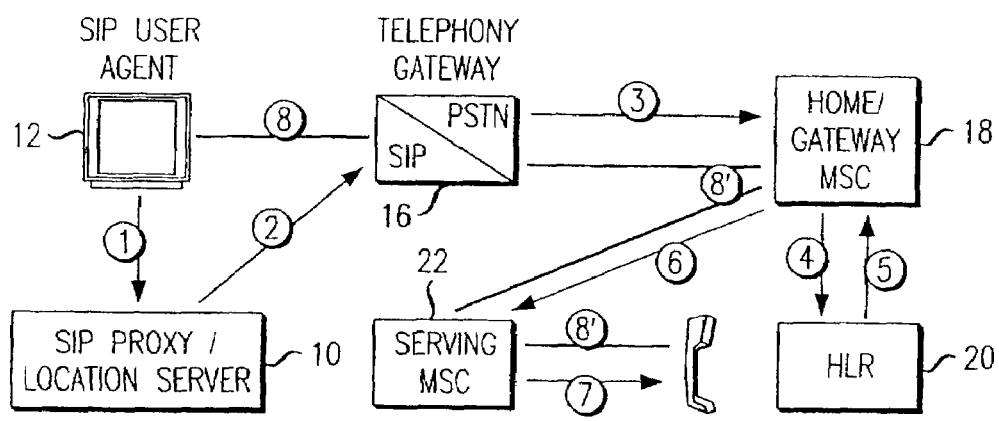
FIG. 2 is an illustration of a prior art call setup for SIP to mobile interworking.

Referring still to FIG. 2, once the location server 10 has selected a telephony gateway gw 16 it sends an INVITE request INVITE SIP:pn@gw to the gateway shown by path 2. The gateway 16 routes the PSTN call leg to either the ANSI41 Home MSC, or the closest GSM/UMTS Gateway MSC 18 of phone pn 14 shown by path 3. Path 4 shows that the Home/Gateway MSC 18 requests routing information for phone pn 14 from a HLR (Home Location Register) database 20. The HLR 20 returns a temporary phone number tpn assigned to the mobile phone 14 shown by path 5. This temporary phone number (tpn)—called TLDN in ANSI41 and MSRN in GSM/UMTS—contains information about the current location of the mobile phone just as a fixed-wire phone number does. Due to the location information in tpn, the home/gateway MSC 18 can issue an IAM tpn request towards the serving MSC 22 shown by path 6. The serving MSC 22 forwards the request to the mobile phone 14 shown by path 7. RTP data then flows over the Internet call leg (path 8), and circuit-switched data is flowing over the PSTN call leg (path 8').

To better understand the issues with regard to a SIP to Mobile Phone inter-working scenario, a distinction should again be made between an ANSI41 and a GSM/UMTS callee. As each call to an ANSI41 cellular phone needs to travel via its Home MSC, triangle routing cannot be avoided. That is, even if the callee is roaming close to the caller's location, the call path will traverse the (possibly distant) Home MSC. Also, the common selection criterion minimize PSTN call leg cannot be met due to the call leg between Home MSC and Serving MSC. Only the PSTN call leg between telephony gateway and Home MSC can be minimized, which is clearly sub-optimal. However, the selection criterion minimize Internet call leg—which can be desired to improve the Quality of Service—can be satisfied by choosing a telephony gateway close to the originating SIP user agent. Table 1 summarizes the above considerations for ANSI41.

The GSM/UMTS concept of multiple, distributed Gateway MSCs, each of which can request the HLR for a temporary, routable phone number, automatically avoids triangle routing in the PSTN call leg. Selection of the telephony gateway that is closest to the originating SIP user agent additionally minimizes the Internet call leg, and consequently minimizes triangle routing of the complete call path. However, the important selection criterion minimize the PSTN call leg can again not be satisfied, due to the lack of information about the callee's location. Table 1 also summarizes which selection criteria can and cannot be met in the SIP to GSM/UMTS interworking scenario.

TABLE 1

| | Gateway selection | |
|---|---|---|
| gateway selection criterion | ANSI41 | GSM/UMTS |
| minimize triangle routing | − | + |
| minimize PSTN call leg | − | − |
| minimize Internet call leg | + | + |

Calls from PSTN to SIP

Figure 3:
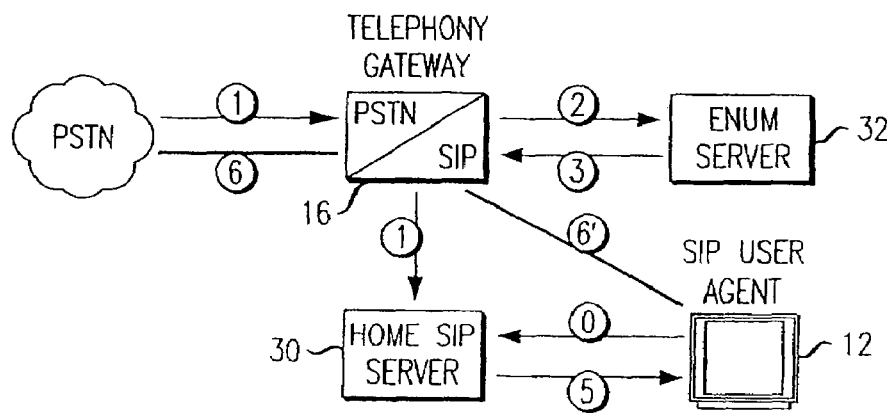
FIG. 3 is an illustration of a prior art call setup for PSTN to SIP interworking.

FIG. 3 illustrates a typical scenario for call set-up from PSTN to a SIP network. In order to make a SIP account addressable from PSTN, it needs to get a phone number assigned. For this scenario, let us assume the phone number pn is assigned to the SIP account SIP:user@home. Before the actual call set-up can take place, the SIP user agent 12 needs to register the SIP account SIP:user@home with its home SIP server 30 shown by path 0. This registration binds the contact address sip-ua, i.e. the IP address of the host that runs the SIP User Agent, to the logical name SIP:user@home. By so doing, the home SIP server 30 is enabled to contact the SIP User Agent 12 when an incoming call request arrives.

As shown by path 1, the originating PSTN 32 sends an IAMpn request to the telephony gateway 16 that appears as a switch capable of routing calls to phone number pn. Typically, the gateway 16 will request an ENUM server to map the phone number pn to the right SIP URL as shown by path 2. Once the gateway 16 has received the URL SIP:user@home as shown by path 3, the gateway 16 sends an INVITE request INVITE SIP:user@home to the callee's home SIP server 30 as shown by path 4. As the home server 30 knows the callee's contact address, it can pass an INVITE sip-ua request to the current location of account SIP:user@home shown by path 5. Circuit-switched media then flows over the PSTN call leg (path 6), and RTP media flows over the Internet call leg (path 6').

In the above interworking scenario, the originating network's lack of information about the callee's current location has the below-described impact on the gateway selection criteria of Table 1. 1) Selection of the telephony gateway that is closest to the originating phone minimizes the PSTN call leg. 2) This selection policy automatically minimizes triangle routing. This is because SIP avoids triangle routing through separation of signaling and media paths. 3) The criterion minimize the Internet call leg cannot be met because the callee's location in the Internet is not known to the PSTN. Although this criterion might seem somehow artificial, it is indeed realistic as soon as Quality of Service aspects need to be considered.

Optimized Gateway Selection

Figure 4:
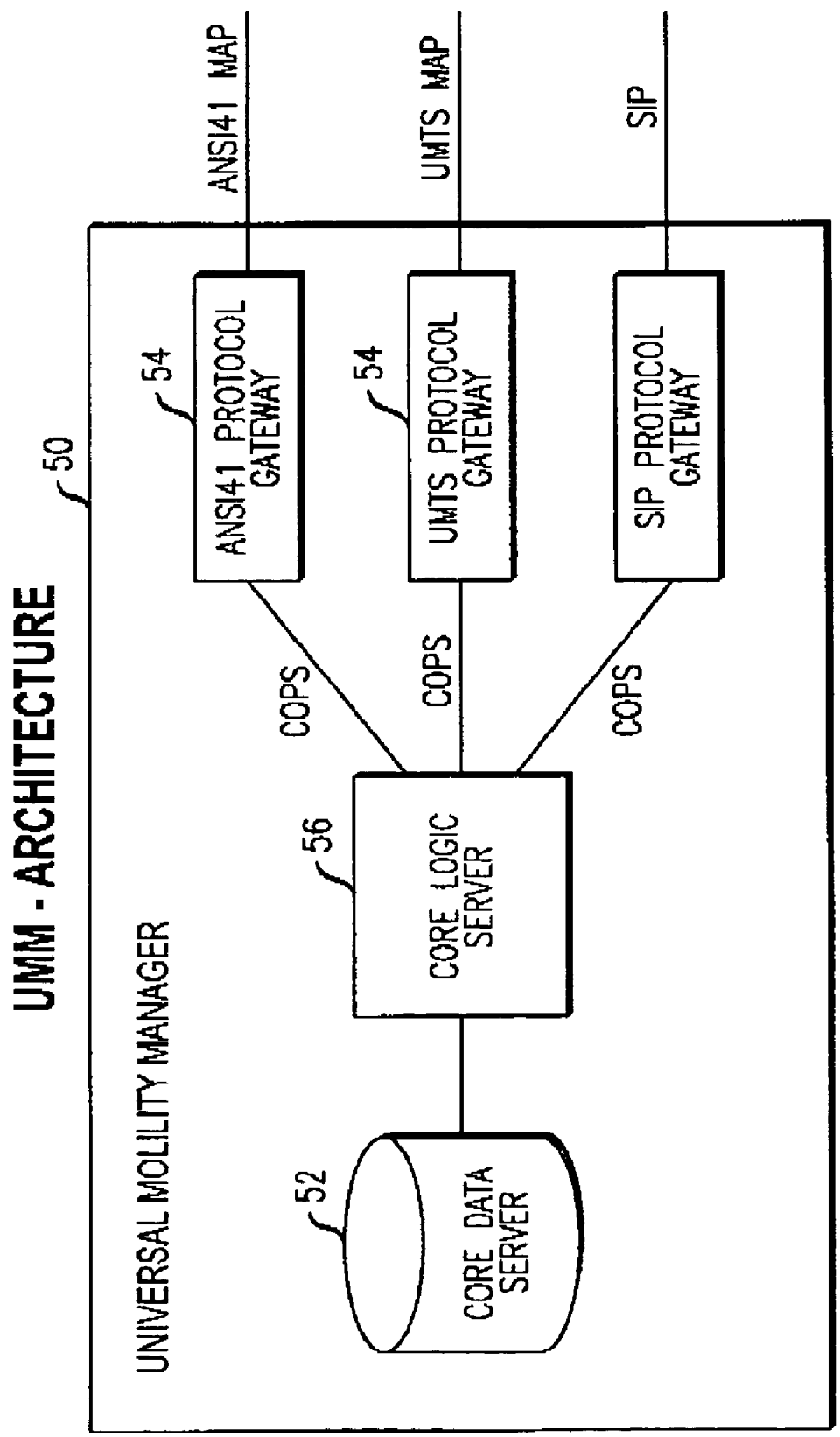
FIG. 4 is an exemplary block diagram of a universal mobility manager architecture according to the present invention.

The optimized gateway selection process of the present invention is based on a Universal Mobility Manager (UMM), a component for inter-technology location management. Referring to FIG. 4, a functional block diagram of an exemplary embodiment of a UMM 50 is shown as it relates to the present invention. The basic UMM 50 includes a core data server 52 that stores location and/or service profile data for multiple different network technologies. Although the data server 52 and the UMM for that matter are represented as single entities, it would be understood that the relevant data and various components may be stored in more than one physical location. The data server 52 couples to various protocol gateways 54 corresponding to the different technologies supported by the UMM through a core logic server 56. The protocol gateways translate incoming registration and location requests into protocol independent, e.g., COPS (common operations) format. The logic server 56 is responsible for the operation execution of the UMM 50 The UMM 50 is capable of holding location information for diverse cellular networks, as well as for Internet telephony systems. For cellular networks, the UMM acts as a traditional HLR (Home Location Register). For an Internet telephony network, the UMM acts as the entities that are responsible for user/terminal registration (registrar in SIP, gatekeeper in H.323) and address resolution (proxy server in SIP, gatekeeper in H.323).

As discussed, the location management component of UMM is capable of storing location information for networks of different protocols e.g., UMTS, ANSI-41, SIP, etc. Using this information, UMM is capable of supporting inter-working among different protocols, unlike a traditional location management unit. This ensures that a call originated in any PSTN can be successfully delivered to any other kind of network, like UMTS, SIP, etc. The problem of optimized gateway selection for call delivery between a circuit switched network and internet telephony systems can be easily solved using UMM. This is because the UMM has location information of the caller even in the case of interworking.

Figure 5:
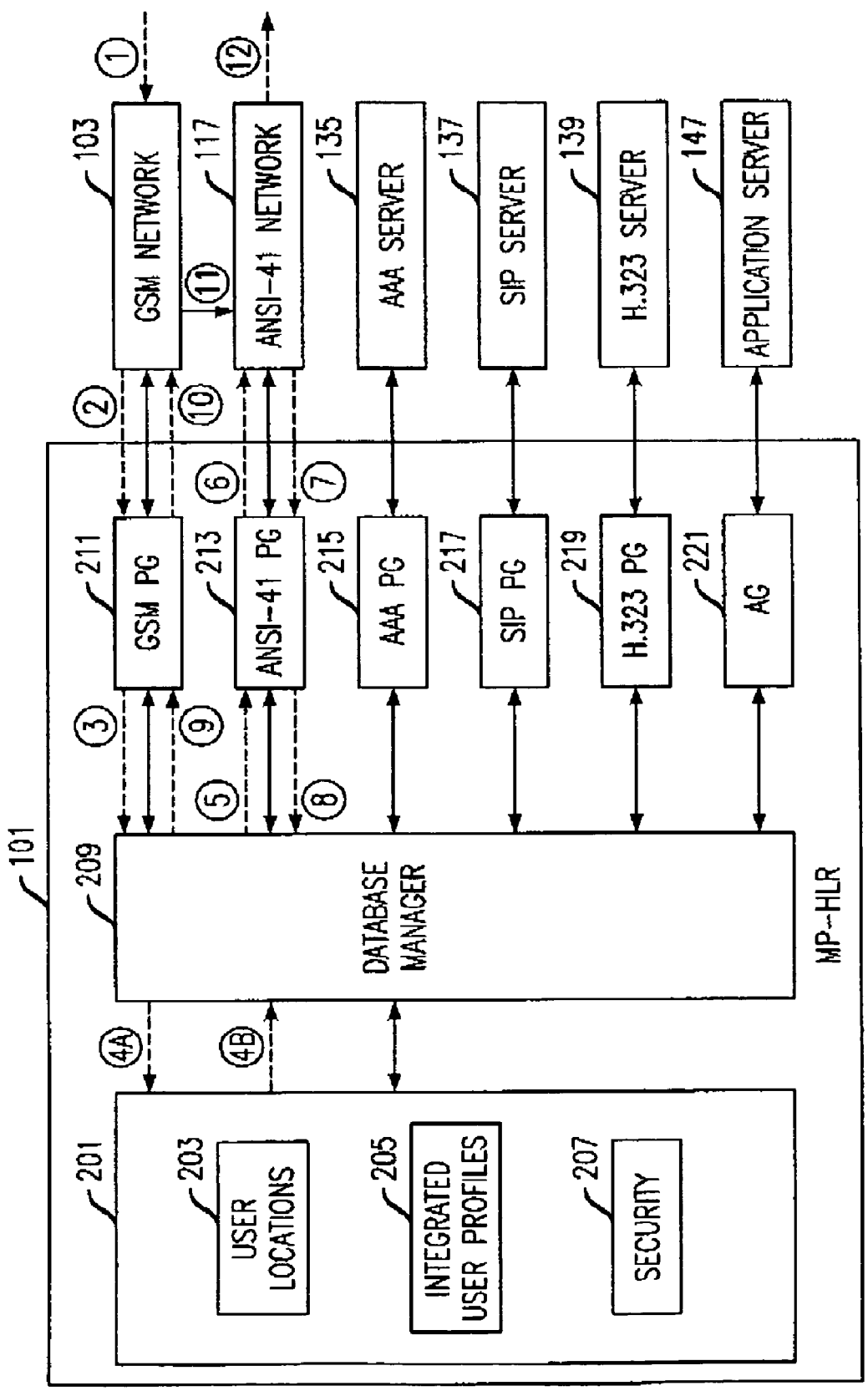
FIG. 5 is a block diagram of an exemplary embodiment of an UMM/multiple-protocol HLR in accordance with the invention.

A more detailed description of an exemplary UMM can be found in related U.S. patent application Ser. No. 09/813,016 entitled Multiple-Protocol Home Location Register and Method of Use by LaPorta et al., filed Mar. 19, 20001, the content of that application being incorporated herein by reference. A block diagram of another embodiment of a UMM or multiple-protocol HLR is shown in FIG. 5. The MP HLR 101 provides a service provider with unified user provisioning and service profile management interface, which is shared across protocols. The first embodiment of the MP HLR 101 includes common data types, a common source of data, and common control procedures that are centralized and projected in different formats to different network types to support user mobility across the different network types. Using this provisioning interface, a service provider may, for example, manage the profiles of different network types for a single user.

A database component 201 comprises user locations 203, integrated user profiles 205, and security information 207 as well as access procedures used by a database manager 209 to access the data via one or more connections to the database component 201. In the preferred embodiment, the database component 201 comprises at least one relational database. Optionally, the database 201 may include information other than user locations, profiles, and security information, which data may not belong to any particular protocol or network, such as user data relating to other applications. Each data element includes information to sustain all network protocols that the MP HLR supports. Unified management of user location information 203 facilitates call delivery between different types of networks. Unified management of security information 207 facilitates authentication between different types of networks.

The integrated user profile database 205 of the MP HLR 101 keeps the profile of users who have access capabilities to one or more network types. A service provider may uniformly manage the profiles of different network types for a single user through the MP HLR 101. The integrated user profile database 205 also includes common user data, e.g., user name, user identification, and directory number for a user, and common service information, e.g., call forwarding directory numbers, that are shared. The integrated user profile 205 in the MP HLR 101 further plays a broader role as a central repository of user and service data. Currently, various data is scattered between somewhat separate components of the network, such as the HLR, SCP, and AAA. The MP HLR 101 promotes the simplification and consolidation of these complex interconnected components into a single repository of subscriber and service data, upon which feed multiple services and applications.

The database manager 209 uses common procedures and exchanges common control commands and operations with one or more protocol gateways (PG), performs interworking functions across multiple different protocols, and manages, accesses, and updates data stored in the database 201. The database manager 209 provides services as a user location database 203 manager, an integrated user profile database 205 manager, and a security database 207 manager. The user location database 203 manager keeps track of the location of a user who may be at cellular terminals and/or at IP terminals. The information is used for delivery of voice call, data session, and a short message to a user. The security database 207 manager manages user authentication control for wireless as well as IP systems. The user profile database 205 manager manages integrated user profile database and exposes the MP HLR database management interface to other functionalities of the database manager 209. In the preferred embodiment, the database manager 209 comprises a plurality of core servers that access the database 201 through one or more connections.

The database manager 209 and database 201 may be considered a single database entity. When a PG queries the database, the PG sends the queries to the database manager 209 to obtain the relevant information from the database. The database manager 209 may be a database application such as Database Views that provides, for example, SQL (Structured Query Language) or LDAP (Lightweight Directory Access Protocol) queries to the database element 201.

The database manager 209 interfaces with a number of protocol gateways. Each protocol gateway (PG) receives messages, including requests and queries, from a particular network. The PG may relay the message if no further processing is required, interpret and/or translate the message, and/or generate one or more queries that are sent to the database 201 via the database manager 209. All PGs utilize the same set of common procedures and commands when querying the database manager 209. The PGs uses common procedures to convert network messages into common commands or operations. In other words, the same set of common messages is utilized between each PG and the database manager 209, regardless of the protocol supported by the PG. For example, the MP HLR 101 utilizes a Register Terminal message when an ANSI network sends a Registration Notification, when a GSM network sends an Update Location, and when an SIP network sends a Register (Location Lookup) message. In another example, the MP HLR 101 utilizes a Request Location message when an ANSI network sends a Location Request, when a GSM network sends a Send Routing Information message, and when an SIP network sends an Invite message.

In the shown embodiment, each protocol gateway supports a single network and the protocol that network utilizes, and translates or interprets messages from that protocol to one of the common messages, such as commands or operations. Examples of PGs shown in FIG. 5 include a GSM PG 211 supporting a GSM network 103, an ANSI-41 PG 213 supporting an ANSI-41 network 117, a AAA PG 215 supporting a AAA (RADIUS) server 135, an SIP PG 217 supporting a SIP server 137, and an H.323 PG supporting an H.323 server 139. The various wireless networks and wire line servers that are shown are examples only, as additional networks, both wire line and wireless, voice, data (packet or circuit based), and/or multimedia, and so forth, may be additionally included in the MP HLR.

The MP HLR 101 may also include one or more application gateways (AGs), such as the one 221 shown in FIG. 2. The AGs provide an interface through which information in the MP HLR 101 is accessed and notification of events, such as a mobile unit powering on or arrival of a mobile at a certain location, may be received. The AGs utilize the same common procedures, commands, and operations to access the database that the PGs utilize, including interpreting messages and requests from the application server 147 and generating queries to the database manager 209 and relaying the database 201 responses to the application server 147.

The AGs 221 include one or more APIs (Application Programming Interfaces) that interface to one or more application servers 147. The AGs may support management APIs and programming APIs for the MP HLR 101. Typically, AGs provide services through a non-standard interface. A provisioning AG provides service providers with an interface to provision user profiles through web-based interfaces as well as CORBA (Common Object Request Broker Architecture) based programming interface to the provider's provisioning center. Other types of interfaces such as LDAP may be sought when needed by introduction of another type of AG. The interface may also be used by an end-user to update the user's database entries though a web browser, e.g., supplementary service activation, call forwarding number update, and prepaid service updates, in which case the AG acts as a web server. A mobility service AG provides third party software vendors with programming API for mobility services. The API may be used to develop location-based service systems for users with cellular and/or internet access capabilities. The AG is an independent logical entity and employs the MP HLR 101 common operation interface to communicate with the database manager 209 and integrated user profile database.

In accordance with the present invention, the UMM enabled call set-up procedures for the interworking scenarios call from SIP to Mobile, and call from PSTN to SIP. It is these scenarios that cannot be handled satisfactorily with existing techniques. The call scenario of from SIP to fixed-wire phone remains as described with respect to FIG. 1, i.e., calls from SIP to fixed-wire PSTN.

Calls from SIP to a Mobile Phone

Figure 6:
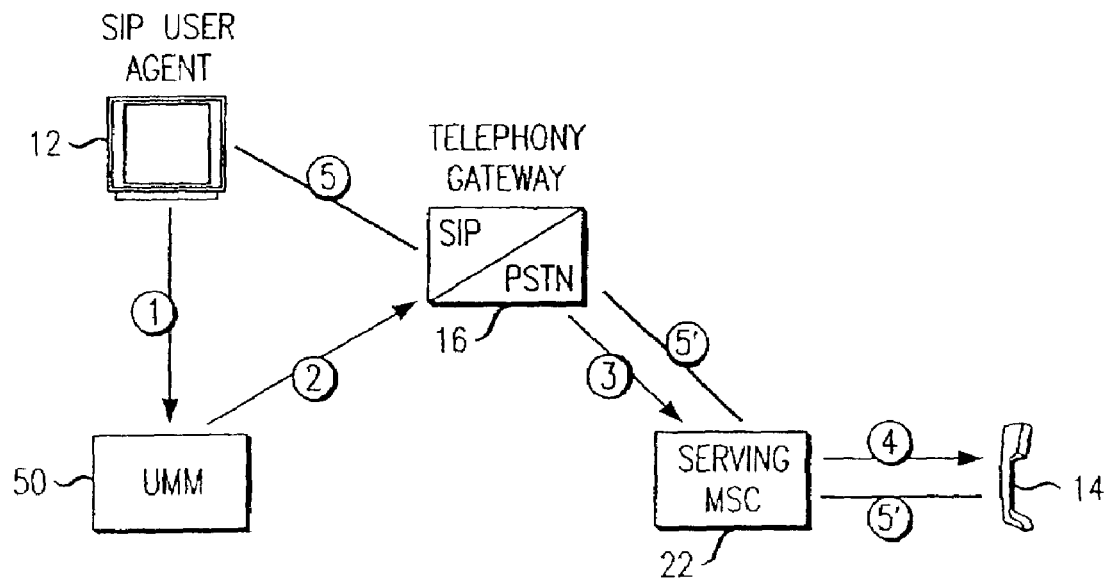
FIG. 6 is an illustration of a call setup for to SIP to mobile interworking with UMM in accordance with the invention.

FIG. 6 illustrates the call flow for calls from SIP to a mobile phone call set-up scenario, using the Universal Mobility Manager (UMM) of the present invention. In this scenario, the UMM 50 appears as an integrated SIP proxy/location server to the originating SIP network. Unlike the prior art scenario of a call from SIP to a mobile phone as previously described, the UMM 50 is not acting as an outbound proxy, but as an inbound proxy responsible for a given domain umm.com.

As shown in FIG. 6, a SIP INVITE request from a Sip user agent 12 for a mobile phone number pn arrives at the UMM 50 as an INVITE SIP:pn@umm.com request as shown by path 1. The UMM 50 knows the serving MSC of phone pn. This is because in accordance with the present invention UMM has capability to act as a cellular HLR at the same time. This location information is used to assign a location dependent, fully routable temporary phone number tpn to the mobile phone pn 14. A significant feature of the present invention is that UMM 50 can use the tpn to reduce the gateway selection problem to the fixed-wire case. Since the tpn is very much the same as a regular fixed-wire phone number, it can be used as input for the (fixed-wire) gateway selection techniques previously described with respect to a call from SIP to fixed-wire PSTN.

Once a gateway gw 16 has been selected, the UMM 50 sends an INVITE SIP:tpn@gw request to the gateway 16 shown as path 2. The telephony gateway 16 sends an IAM tpn to the serving MSC 22 shown by path 3. The serving MSC 22 forwards the call request to the mobile phone 14 shown by path 4. Eventually, RTP media flows over the IP call leg (path 5), and circuit-switched data flows over the PSTN call leg (path 5').

As can be seen, the present invention methodology provides that the call path can bypass the callee's home MSC (for calls to ANSI41) or the gateway MSC (for calls to GSM/UMTS), respectively. Usually, these entities are needed to have the mobile phone pn mapped to a temporary, fixed-wire phone number tpn. Bypassing them gives UMM the freedom to select a telephony gateway anywhere between caller and callee, instead of somewhere between caller and home MSC or gateway MSC, respectively. It can now be understood that all of the selection criteria of Table 1 are now satisfied as shown in Table 2 for both a GSM/UMTS and a ANSI41 callee. Recall that triangle routing had been a problem for ANSI41 because the call needed to be routed via the callee's home MSC. The present invention addresses this issue and these considerations are summarized in Table 2. Advantageously, it is important to note that this call set-up scenario does not require modification of any component other than UMM; this includes the SIP user agent as well as the telephony gateway.

TABLE 2

Ability to meet selection criteria with UMM call set-up

| gateway selection criterion | ANSI41 | GSM/UMTS |
|---|---|---|
| minimize triangle routing | + | + |
| minimize PSTN call leg | + | + |
| minimize Internet call leg | + | + |

Calls from PSTN to SIP

Figure 7:
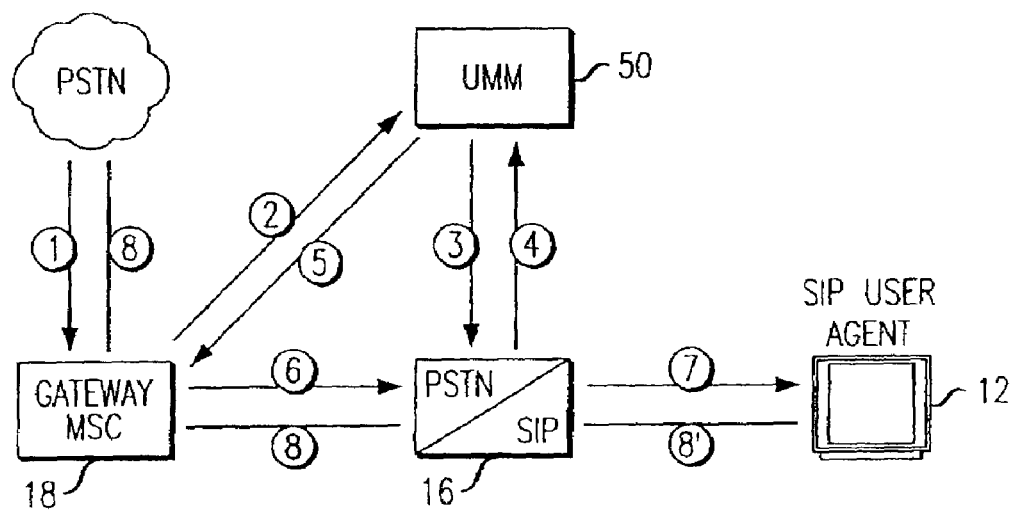
FIG. 7 is an illustration of a call setup for PSTN to SIP interworking with UMM in accordance with the invention.

An exemplary call flow for a PSTN to SIP call set-up, using the Universal Mobility Manager, is shown in FIG. 7. As previously discussed with respect to FIG. 3 (regarding calls from PSTN to SIP), a SIP user agent sip-ua 12 acting on behalf of the account SIP:user@home needs to register itself with its home SIP server to make itself reachable as shown by path 0 of FIG. 3. In a similar fashion to the discussion of calls from PSTN to SIP, a SIP account e.g. SIP:user@home needs an associated phone number pn to be addressable from PSTN. Since a first goal is to have the PSTN 32 transfer the call control to the UMM 50 (acting as a HLR), cellular phone numbers are used to denote SIP accounts. Since a second goal is to minimize the call leg that is routed before gateway selection, GSM/UMTS phone numbers are used rather than ANSI41 numbers. By so doing, the call that originates from the PSTN 32 is automatically routed to the nearest Gateway MSC as shown by path 1 of FIG. 6. This call leg is the only part of the entire call path that is routed without knowledge of the callee's destination. Had an ANSI41 phone number been used instead, the call would have been routed to the respective Home MSC, independent of the caller's location.

As shown by path 2 of FIG. 7, the Gateway MSC 18 asks UMM 50—acting as a GSM/UMTS HLR—for routing information for phone number pn. The UMM 50 maps pn to the SIP URL SIP:user@home, and looks up the location information, i.e. the current IP contact address sip-ua of this SIP account. The UMM can perform these steps due to its inter-technology location information. At this point, UMM has knowledge about the locations of both caller and callee. Again, this information is used to perform the optimized gateway selection process with the techniques previously described, for example, with respect to calls from SIP to fixed-wire PSTN.

Once a telephony gateway 16 has been selected, the UMM 50 requests this gateway to allocate a new temporary phone number within its range, and to assign it to the SIP URL SIP:sip-ua as shown in path 3. This requires the telephony gateway 16 to: 1) manage a pool of phone numbers each of which can be temporarily assigned to a SIP URL; and 2) allow some external entity (in this case the UMM) to request the assignment of a temporary phone number to a given SIP URL. For this purpose, a new SIP message, ASSIGN, is proposed that carries the SIP URL in the TO} header field. The response will return the newly assigned temporary phone number. SIP is used because the telephony gateway needs to talk SIP anyway, and SIP can be extended much more easily than the SS7, the circuit-switched signaling protocol.

Note that this assignment of a temporary phone number for routing purposes is analogous to what a HLR does to enable the requesting Gateway/Home MSC to route a call request to its destination. Actually, this assignment of a temporary routing number is done by the serving VLR (visiting location register), not by the HLR itself. For simplicity reasons we have abstracted from this separation. In this sense, the telephony gateway needs to implement serving VLR like functionality.

After the gateway 16 has returned the a temporary phone number tpn shown by path 4, the number can be further passed to the Gateway MSC 18, shown in path 5, that had been requesting the routing information. Like an ordinary phone call, the Gateway MSC 18 routes the call to the telephony gateway by issuing an IAM tpn request to it as shown by path 6. On the SIP side, the telephony gateway 16 sends an INVITE sip-ua to the SIP user agent 12 as shown by path 7. Circuit-switched media then flows over the PSTN call leg (path 8), and RTP media is flowing over the IP call leg (path 8').

This present invention approach supports minimization of the PSTN callleg and minimization of triangle routing through selection of a telephony gateway close to the caller, as does the previously described inter-working scenario for calls from PSTN to SIP. Due to the UMM's knowledge of the location of the SIP callee, the invention also allows for minimization of the IP call leg through selection of a telephony gateway that is close to the callee. Hence, the approach of the present invention can optimize the gateway selection process towards criteria that usually cannot be met.

Issues with Mobile IP

As has been explained, the UMM's knowledge of a SIP user's IP contact address allows for optimized gateway selection in the case of PSTN to SIP call set-up. Unfortunately, the situation is more complicated if the SIP user agent runs on a mobile IP host. Here, similar to wireless telephony, the IP address loses the relationship to a particular location. Instead, it denotes the respective device wherever it roams in the global network.

With mobile IP, packets to the mobile IP address are intercepted by the home agent and forwarded to the mobile host's current Care-of-Address CoA. The CoA can either denote the address of a so-called foreign host that is responsible to receive the forwarded packets and to dispatch it to the mobile host; or it can be an IP address dynamically assigned to the mobile host itself. In any case, whenever the mobile host connects to a new foreign network, it needs to registers its Care-of-Address with its home agent.

To optimize the gateway selection process in the PSTN to SIP scenario, the UMM needs to know the callee's current Care-of-Address. If route optimization is supported—which is optional in IPv4 and mandatory in IPv6 —the UMM can simply send a mobile IP binding request packet to the mobile IP address in order to learn the mobile host's current location. This request will be answered by a binding update packet containing the Care-of-Address. In case of IPv4, the home agent sends the binding update; while in IPv6, the mobile host sends it.

If route optimization is not supported, any mechanism to query the current Care-of-Address of the mobile host needs to be implemented on top of the standard mobile IP mechanisms. One possible approach would be to run a demon/server on the mobile host that sends back the current CoA when it receives a (application layer) binding update request. However, for mobile hosts that do not run this demon their current location cannot be determined and thus the gateway selection process cannot be based on knowledge of the entire call path.

The foregoing description merely illustrates the principles of the invention. It will thus be appreciated that those skilled in the art will be able to devise various arrangements, which, although not explicitly described or shown herein, embody the principles of the invention, and are included within its spirit and scope. Other applicable systems include, for example, Code Division Multiple Access (CDMA), High Data Rate (HDR) for CDMA data, Universal Mobile Telecommunications System (UMTS), and General Packet Radio Service (GPRS). Additional coupling between devices is possible, although not shown for the sake of simplicity. Furthermore, all examples and conditional language recited are principally intended expressly to be only for instructive purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of selecting a gateway for interworking between first and second networks supporting different network protocols, said method comprising the steps of:
   querying a unified location management device having location information stored therein for users of said different network protocols, said users including mobile users;
   relaying mobile user location related information from said unified location manager regarding a user of one of said first and second network; and
   selecting said gateway based on said location information provided;
   wherein for calls from an internet telephony device to a mobile device, said unified location manager operates as an inbound proxy for a given IP domain allowing selection of a location dependent routable temporary phone number such that a call path from the internet telephony device to the mobile device bypasses the mobile device's home MSC or gateway MSC; and for PSTN originated calls to an internet telephony user, cellular numbers are used to denote internet telephony telephones.

2. The method of claim 1, wherein said step of selecting is optimized by providing a selection that minimizes any one of triangle routing, a PSTN call leg or an Internet call leg.

3. The method of claim 1, wherein selection of said gateway is optimized by selecting a gateway that minimizes a circuit switched portion of a call.

4. The method of claim 1, wherein said location related information is used to assign a location dependent routable temporary telephone number for use in said gateway selection.

5. The method of claim 1, wherein said internet telephony telephones are associated with SIP accounts.

6. The method of claim 1, wherein said mobile location information can correspond to an internet telephony user.

7. The method of claim 6, wherein said location related information provides assignment of a GSM/UMTS temporary phone number.

8. The method of claim 1, wherein said unified location manager is operable as a home location register for cellular networks and as a user registration and address resolution device for internet telephony networks.

9. The method of claim 1, wherein said universal location manager uses a current Care-of-Address for providing said location related information for a mobile Internet telephony user.

10. The method of claim 1, wherein one of said first and second networks is circuit switched network and one of said first and second networks is an internet telephony network.

11. The method of claim 1, wherein the plurality of network protocols comprises at least two of ANSI-41, GSM MAP, SIP, H.323.

12. A method used for selecting a gateway for a call from a first network to a mobile user in a second network, said first and second networks supporting different network protocols, said method comprising the steps of:
   querying a unified location management device having location information for multiple mobile network technologies stored therein; and
   providing location related information for said mobile user in said second network for use by said first network in selection of said gateway;
   wherein for calls from an internet telephony device to a mobile device, said unified location manager operates as an inbound proxy for a given IP domain allowing selection of a location dependent routable temporary phone number such that a call path from the internet telephony device to the mobile device bypasses the mobile device's home MSC or gateway MSC; and for PSTN calls to an internet telephony user, cellular numbers are used to denote internet telephony telephones.

13. The method of claim 12, wherein said selection of said gateway is optimized by providing a selection that minimizes any one of triangle routing, a PSTN call leg or an Internet call leg.

14. The method of claim 12, wherein said selection of said gateway is optimized by selecting a gateway that minimizes a circuit switched portion of a call.

15. The method of claim 12, wherein said location related information is used to assign a location dependent routable temporary telephone number for use in said gateway selection.

16. The method of claim 12, wherein said internet telephony telephones are associated with SIP accounts.

17. The method of claim 12, wherein said mobile location information can correspond to an internet telephony user.

18. The method of claim 12, wherein said unified location manager is operable as a home location register for cellular networks and as a user registration and address resolution device for internet telephony networks.

19. The method of claim 12, wherein said universal location manager uses a current Care-of-Address for providing said location related information for a mobile Internet telephony user.

20. The method of claim 12, wherein one of said first and second networks is circuit switched network and one of said first and second networks is an internet telephony network.

21. An apparatus for enabling optimized gateway selection for interworking between a first and second network, said apparatus comprising:
- a data server for storing location and service profile data for multiple differing network technologies including mobile network technology;
- at least two network protocol gateways for translating incoming location information requests into a protocol independent format;
- a processor for interfacing between said data server and said protocol gateways, wherein mobile user location related information is able to be provided by said apparatus for use in selection of said gateway;
  - wherein for calls from an internet telephony user/device to a mobile device, said apparatus operates as an inbound proxy for a given IP domain allowing selection of a location dependent routable temporary phone number such that a call path from the internet telephony device to the mobile device bypasses the mobile device's home MSC or gateway MSC; and for PSTN originated calls to an internet telephony user, cellular numbers are used to denote internet telephony telephones.

22. The apparatus of claim 21, wherein said selection of said gateway is optimized by providing a selection that minimizes any one of triangle routing, a PSTN call leg or an Internet call leg.

23. The apparatus of claim 21, wherein said selection of said gateway is optimized by selecting a gateway that minimizes a circuit switched portion of a call.

24. The apparatus of claim 21, wherein said location related information is used to assign a location dependent routable temporary telephone number for use in said gateway selection.

25. The apparatus of claim 21, wherein said internet telephony telephones are associated with SIP accounts.

26. The apparatus of claim 21, wherein said mobile location information can correspond to an internet telephony user.

27. The apparatus of claim 21 wherein said unified location manager is operable as a home location register for cellular networks and as a user registration and address resolution device for internet telephony networks.

28. The apparatus of claim 21, wherein said universal location manager uses a current Care-of-Address for providing said location related information for a mobile Internet telephony user.

29. The apparatus of claim 21, wherein one of said first and second networks is circuit switched network and one of said first and second networks is an internet telephony network.

30. The apparatus of claim 21, wherein the plurality of network protocols comprises at least two of ANSI-41, GSM MAP, SIP, H.323.

* * * * *

UNITED STATES PATENT AND TRADEMARK OFFICE
CERTIFICATE OF CORRECTION

PATENT NO. : 7,633,896 B2
APPLICATION NO. : 10/055333
DATED : December 15, 2009
INVENTOR(S) : Doshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Twenty-first Day of December, 2010

David J. Kappos
*Director of the United States Patent and Trademark Office*